(No Model.) 6 Sheets—Sheet 1.

W. KEAST.
AUTOMATIC BRAKING AND COUPLING MECHANISM FOR RAILWAY CARS.

No. 410,322. Patented Sept. 3, 1889.

Fig. 1.

WITNESSES:
S S Gray
Z F Wilber

INVENTOR
William Keast
BY R H McDermott
ATTORNEY (No Model.) 6 Sheets—Sheet 2.

W. KEAST.
AUTOMATIC BRAKING AND COUPLING MECHANISM FOR RAILWAY CARS.

No. 410,322. Patented Sept. 3, 1889.

WITNESSES:
S. S. Gray
J. F. Wilber

INVENTOR
William Keast
BY R. M. McDermott
his
ATTORNEY (No Model.) W. KEAST. 6 Sheets—Sheet 3.
AUTOMATIC BRAKING AND COUPLING MECHANISM FOR RAILWAY CARS.
No. 410,322. Patented Sept. 3, 1889.

WITNESSES:
S. S. Gray
J. F. Wilbur

INVENTOR
William Keast
BY R. M. McDermott
his
ATTORNEY (No Model.) 6 Sheets—Sheet 4.

W. KEAST.
AUTOMATIC BRAKING AND COUPLING MECHANISM FOR RAILWAY CARS.

No. 410,322. Patented Sept. 3, 1889.

Fig. 6.

WITNESSES:

INVENTOR
William Keast
BY
ATTORNEY (No Model.) 6 Sheets—Sheet 5.
W. KEAST.
AUTOMATIC BRAKING AND COUPLING MECHANISM FOR RAILWAY CARS.
No. 410,322. Patented Sept. 3, 1889.

Fig. 7.

WITNESSES:
S. S. Gray
J. F. Wilbur

INVENTOR
William Keast
BY R. M. McDermott
his
ATTORNEY (No Model.)  6 Sheets—Sheet 6.

W. KEAST.
AUTOMATIC BRAKING AND COUPLING MECHANISM FOR RAILWAY CARS.

No. 410,322.  Patented Sept. 3, 1889.

WITNESSES:
S. S. Gray
F. F. Wilber

INVENTOR
William Keast
BY R. H. McDermott
His
ATTORNEY

UNITED STATES PATENT OFFICE.

WILLIAM KEAST, OF CENTRAL CITY, COLORADO.

AUTOMATIC BRAKING AND COUPLING MECHANISM FOR RAILWAY-CARS.

SPECIFICATION forming part of Letters Patent No. 410,322, dated September 3, 1889.

Application filed October 1, 1888. Serial No. 286,922. (No model.)

*To all whom it may concern:*

Be it known that I, WILLIAM KEAST, a citizen of the United States of America, residing at Central City, in the county of Gilpin and State of Colorado, have invented certain new and useful Improvements in Automatic Braking and Coupling Mechanism for Railroad-Cars, of which the following is a specification, reference being had therein to the accompanying drawings.

My invention relates to an improved system of mechanism for automatically coupling together and operating the braking mechanism of railway-cars. Its objects are to provide an efficient, reliable, and comparatively simple system of devices insuring the automatic application of the brakes to the wheels of a car whenever such car is at rest, and the release of such brakes whenever the car is in motion, and hence either there is a strain or pull upon the draw-head or coupling-bar, as in forward motion, or a push upon what may be termed a "bumper-head" in backward motion, and to combine therewith means by which the brakes, when desired, may be operated either manually or by other power independently of the automatic mechanism thrown into operation by the draw-head or coupling-bar or by the bumper-head; and, further, for the accomplishment of these ends, to provide a powerfully-acting brake mechanism in which the force used in applying the brakes to the wheels is furnished by the rotation of the wheels themselves, so that the greater the speed of the car to be stopped the more speedily and powerfully are the brakes applied, the mechanism for applying the brakes being actuated by the axles and thrown into or out of operative connection therewith by means under control of the draw-head or coupling-bar, the bumper-head, the manually or otherwise operated devices before referred to, and of devices themselves operated by the breaking apart of a train; and, further, to provide a coupling device automatic in action, but adapted to be used with or connected to couplers of ordinary and usual construction when necessary, but especially designed, adapted, and fitted to perform the work in this system relegated to the draw-head or coupling-bar for performance; and, further, to provide means by which the brake mechanism may be automatically and immediately set in operation and the brakes applied whenever the train may break in two or some of the cars become accidentally detached from the remainder of the train, the brakes being set on all the cars, and to also arrange such means so that they may be operated from the engine and that the brake mechanism may at all times be under control of the engineer; and to these ends the invention consists in the features, arrangements, and combinations more particularly hereinafter described and claimed.

In the drawings is illustrated an embodiment of my invention, in which drawings—

In describing my invention as represented in these figures, the brake mechanism proper, or means by which the brake-shoes are applied to the wheels, will first be described.

Figure 2:
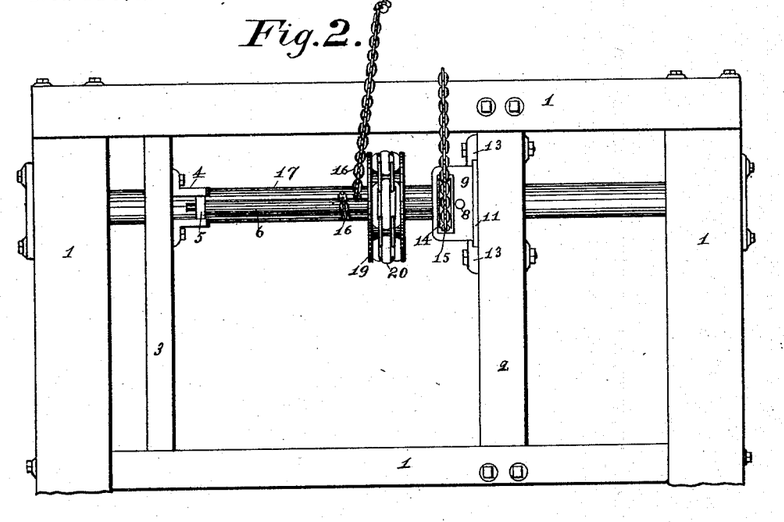
Fig. 2, a top view of a truck with the brake mechanism proper applied thereto.
Figure 3:
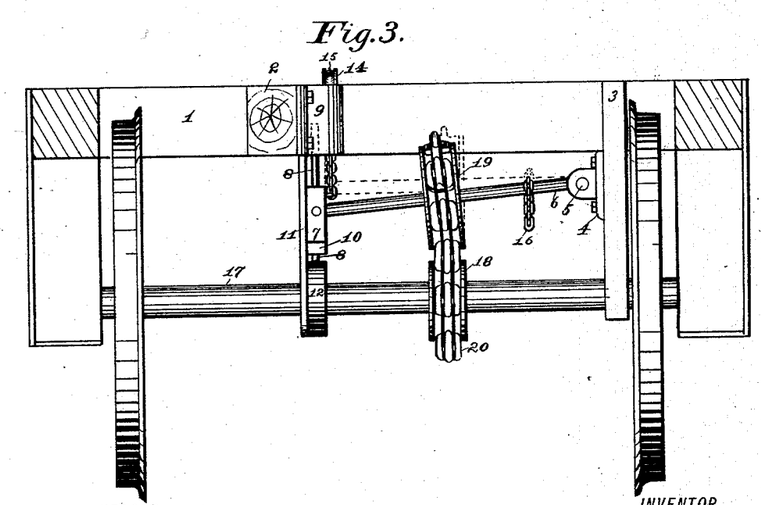
Fig. 3, an end view of Fig. 2 with part of the end of the truck-frame removed.

The reference-numerals 1 1 indicate the outer truck-frame, of any usual construction. Between two of the cross-timbers 1 of such frame are secured the longitudinal timbers 2 and, 3 for supporting the devices immediately hereinafter described. Upon the support 3 are secured the brackets or ears 4 4, in which is pivoted the bearing-box 5, in which is journaled one end of a shaft 6, its other end being journaled in a box 7. From either vertical end of this box 7 project pins 8, taking in guiding-apertures in blocks 9 and 10, which are formed with or secured to and project from a base 11. Such base carries at its lower end a journal or bearing box 12, through which passes the axle 17. At its upper end this base 11 is supported and guided in a slot or groove 13, formed in the support 2. Upon the main axle 17 is secured a band wheel or pulley 18, while a similar wheel or pulley 19 is secured upon the shaft 6 immediately above the wheel 18. Over these wheels passes a belt or band, herein shown as a chain shoe-belt 20.

To the shaft 6 is secured one end of a chain 16, and which may be wound upon the shaft on rotation thereof, while its other end proceeds to and is attached to the brake-lever, from which connections are made to the brake bars and shoes to bring them against the wheels in the usual manner. To the journal or bearing box 7 is attached one end of a chain 15, by which the box 7, and of course the shaft 6 and wheel 19, may be raised, the other end of the chain proceeding to and being connected with means for such raising, hereinafter described.

The chain belt 20 is of such length relatively to the distance apart of the wheels 18 and 19 when the latter and its shaft 6 are in their lower position that there is not sufficient grip or friction between it and the wheels to transmit motion from one to the other, but that when the box 7 is raised by a pull on chain 15, or by other means, the shaft 6 and wheel 19 are so raised that the chain belt is pulled taut upon the wheels and transmits the movement from 18 to 19, causing the rotation of the shaft 6 and the winding thereupon of the chain 16, which, being connected to the brake-lever, causes the brakes to be applied to the wheels proportionately to the revolution thereof.

As the axle and wheels support the truck-frame by spring-bearings, there is variation of distance between the axle 17 and shaft 6, due to vertical vibration of the frame upon the springs and to variations of load upon the truck. By supporting the upper end of the base 11 in a slide or grooved way in the support 2, as shown, such variation is taken up by the chain 15 when it is in use and the wheels or pulleys 18 and 19 maintained at proper operative distance apart. For the easier operation of the chain 15 to raise the box 7 and shaft 6, it passes over a pulley 14, journaled in the block 9.

It is evident that the guiding of the box 7 as it is moved up and down could be done by means other than the guide-rods 8, and that the box itself might be arranged to slide in and be guided by grooved ways upon the side of the base 11.

Figure 4:
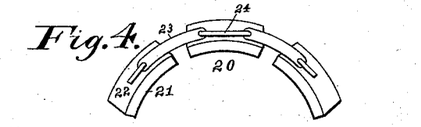
Fig. 4, views of part of the clutch-chain seen in Figs. 2 and 3.

To insure a firm grip or sufficient friction between the wheels 18 and 19 and the chain 20, I have devised a chain of peculiar construction, which, though any other style may be used, I prefer to use. Each link therein is composed of a broad shoe 21, concaved on its inner side to follow the curvature of the pulleys 18 19, a central narrower part 22 rising from the shoe portion. These links are connected together by the arms or bars 23, pivoted thereto by means of staples 24, these staples passing through both the bars 23 on both sides of a shoe-link and securing at once all four bars thereto.

As before stated, the box 7 is to be raised and the brakes operated whenever the car is at rest, and the box lowered and the brakes thrown off whenever the car is in motion. This is accomplished through the medium of a peculiar coupling-bar and bumper-head acting through intermediate mechanism, and such coupling and bumper-head will now be described, and such description of the one at one end of the car applies to that at the other end, the two sets being duplicates each of the other.

Figures 5, 8:
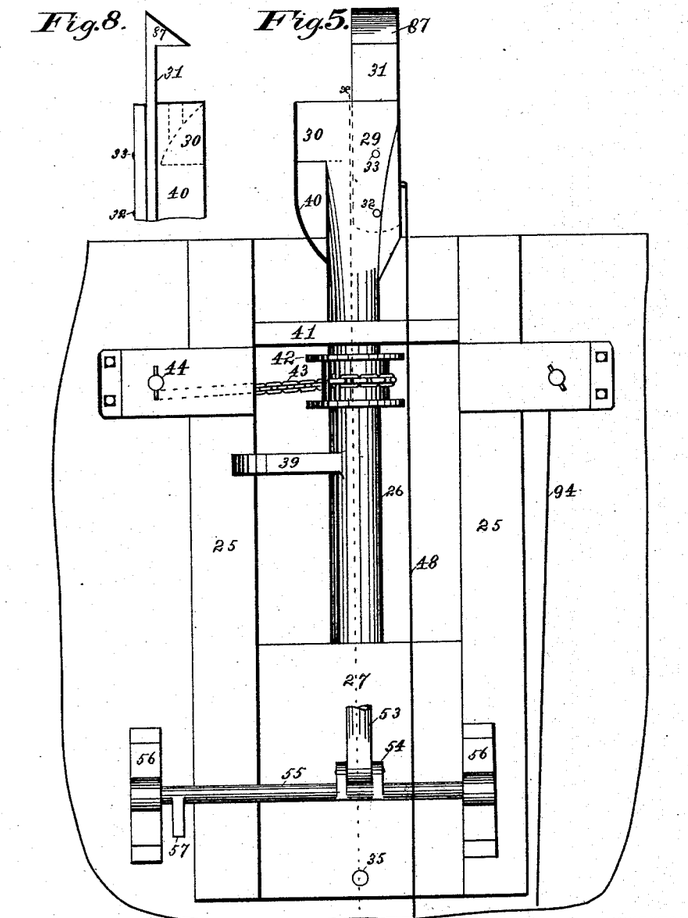
Fig. 5, an enlarged detached plan view of the coupling and bumper mechanism.
Fig. 8, a side view of part of the draw-head shown in Fig. 5.
Figure 6:
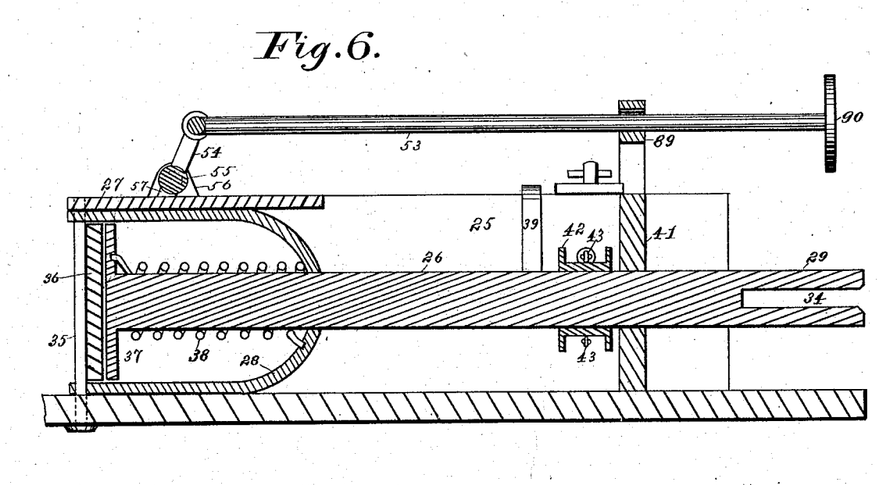
Fig. 6, a section on line $x\,x$, Fig. 5.

Longitudinally of the car and for a sufficient distance are the two supports 25 25, a suitable space apart, between which is located the coupling-bar 26. The head 29 of this draw-bar has a side extension 30, beveled or sloping from its rear to its front, so that an incline is formed upon which may take and act the inclined head of a coupling-latch of an adjoining car, each coupling-head being provided with such a latch, the one for this coupling-bar being shown at 31. It consists of a body pivoted in a slot in the draw-bar, from whence the body projects in front of the head of the coupling-bar and terminates in the head 87, whose inner wall is at right angles to the body 31, while its outer surface is beveled from a line or edge or about a line or edge in front to the rear wall. This latch is pivoted at 32 in the slot in the head, so that it may be turned to the front in operative position, in which position it is locked by the pin 33 passing through it and the walls of the slot, or that it may be turned back out of operative position and out of the way when it is necessary to use a common link for coupling, a slot 34 transversely of the head permitting such link to be used. About midway of this coupling-bar, or toward its front, it is supported in a cross-piece 41, extending between the side supports 25 25, and in or on which it has some sidewise play or movement. At its rear end it is secured and supported in a box or housing 28, which in turn rests on and is supported by the cross-brace 27, extending from one to the other of the longitudinal supports 25. This box or housing is of an oval shape generally in cross-section, somewhat flattened, however, upon the longer opposite portions of the oval to give better bearing and securing surfaces. It also rounds off or tapers somewhat at its front end, in which is an aperture through which passes the body of the coupling-bar 26, which is provided at its inner end within the box or housing with a washer, lug, or pin 28, preventing the withdrawal of the bar, and also affording the means for compressing a spring 38, coiled around the bar within the box or housing, the spring at its other extremity resting against the forward end of the box or housing. This arrangement permits some longitudinal play or movement of the draw-bar, the spring acting normally to pull the same backward so far as is permitted by the housing, while the stress of forward movement pulls the bar against the force of the spring, and this capacity for such movement is taken advantage of and designed for controlling the braking mechanism. The rear end of such housing or box may be open or may be closed by a cap, and it is retained in place by the king-bolt 35 passing through the rear thereof, the body of the car, and the cross-brace 27, such pivoting permitting a limited amount of lateral movement to the housing and the coupling-bar to permit them to properly adjust themselves when a train is passing around a curve. To avoid unnecessary jar and blow when the bar is pulled back by the spring, a cushion 36, of rubber or equivalent material, is secured in the rear of the box or housing 28, against which the inner end of the bar strikes. As the coiled spring in the box 28 has a tendency to throw the bar 26 around or cause it to revolve, a stop-arm 39 is arranged to project from the bar and take against one of the supports 25 or other suitable stop and hold the bar normally with its head 29 and coupling-extension 30 in one horizontal plane. This tendency of the spring 38 to rotate the bar is availed of to render the apparatus self-coupling as well as self-braking, for as two cars similarly equipped come together the beveled latch-head 31 of one slides over the beveled extension 30 of the other, causing the latter and its bar to rotate, or both to rotate, until the latches slip by each other, when the spring or springs 38 cause the coupling-bars to return to their normal position, locking the couplings of the two cars firmly together.

To prevent the more effectually the latch-heads from becoming disengaged from the coupling-extensions 30, the outer edges of the latter may be provided with side guards 40, secured thereto, and which may extend backward in bracket or brace form, and also be secured to the body of the coupling-bar 26, and thereby stiffen and strengthen the coupling-extension 30.

In order that the bar and its head may be turned to release the coupling, a pulley-wheel 42 is secured upon the bar, to which is attached and upon which is partly wound a chain 43, whose other end is secured to a wheel capable of rotation by hand from the platform of a car or to a lever 44, pivoted in a support upon the body of the car and extending up so as to be worked from the platform.

Figure 1:
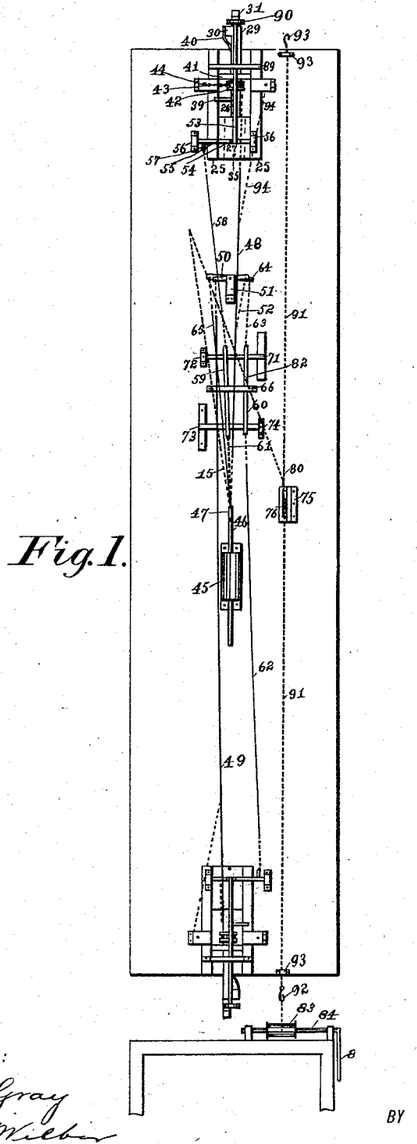
Figure 1 is an underneath plan view of a car with part of the invention in place, the trucks being removed.

To utilize the longitudinal movement provided for the coupling-bar or draw-head for the control of the braking mechanism, the following mechanism is used: At a suitable point on the under body of the car is secured a case 45, within which is a coiled or other suitable spring 88, surrounding a rod 46, passing through such case, such rod having at one end, herein designated the "front end," a head 47, formed as a hook or as an eye. The spring and the rod are so arranged that the former shall pull the latter back normally so far as the head 47, or other stop arranged for the purpose, permits. To the head 47 is secured one end of the chain, before described as attached at its other end to the shaft 6 to cause the lifting thereof and throw the brake mechanism into operation. The length of such chain is so adjusted that when the spring 88 draws back the rod 46 to normal position the chain 15 is so drawn upon as to hold the shaft 6 so elevated that the brakes are applied. Another connection 48, composed of rod and chain, as indicated by full and by broken lines, extends from the head 47 of the rod 46 to the front draw-head or coupling-bar 26, and of such length that when both springs 38 and 87 are in a normal condition it shall be just about taut. Then when a train or car is at rest with no strain on the draw-head or coupling-bar the spring 87 pulls on the chain 15, lifting the shaft 6 and keeping the "brakes set;" but when a strain is put upon the draw-bar or coupling-bar, as when starting a train or when keeping it in motion, such bar is pulled forward against the stress of its spring 38 and its forward movement pulls the connection 48, pulling forward the rod 46 and its head 47, which slackens the chain 15, permitting the shaft 6 to drop, so that chain belt 20 no longer acts to rotate the shaft and its pulley 19, and the brakes are thrown off. To accomplish the same result from the other (or, as herein termed, the "rear") end of the car, a connection 49, likewise of rod and chain, leads from the draw-head or coupling-bar 26 at such end of the car to one end of a lever 50, centrally pivoted in a bracket 51, secured upon the body of the car between the spring 45 and the front end. From the other end of lever 50 is a chain connection 52 to the direct connection 48 from the front draw-head or coupling-bar to the head 47 of rod 46, so that pull or strain on such rear draw-bar produces the same sequence of actions as those described for the front bar.

As so far described provision is made for releasing the brakes only when the train is in forward motion, for if it be attempted to back the car or train the draw-head or coupling-bar is immediately relieved of strain or pull and the brakes set. Provision to then throw them off, however, is made, and is as follows:

Journaled in brackets or lugs 56, projecting from and supported on or from the bottom of the car, is a rock-shaft 55, from which project, and in opposite directions, the two lever-arms 54 and 57, the former projecting downwardly at the median longitudinal line of the car and the latter projecting upwardly at a point enabling it to clear the support 25 on the side on which it is located.

Pivoted in the outer end of lever-arm 54, and projecting to the front therefrom, is a bumper-rod 53, provided with a suitable head 90, the rod and head lying along beneath the coupling-bar or draw-head 26. Instead of the two lever-arms 54 and 57 projecting from different parts of the length of the rock-shaft 55, it is evident that they could project from exactly opposite parts if the rod 53 were so lengthened that the shaft 55 could be pivoted in the rear of the cross support or brace 27 and the box or housing 28. From the outer end of the arm 57 a connection is made to the head 47 of the spring-rod 46 by means of rod and chain 58, chain 61, and the sliding bar 59, and the length of such connection is so adjusted that when the spring 88 is in a normal condition of rest it keeps the connection just about taut, with the bumper-head 90 projecting slightly beyond the normal position of the end of the draw-head or coupling-bar 26. If then force be applied to back the train, the draw-bars or coupling-bars are drawn backward by the spring 88, whereupon the force acts upon the bumper-head 90, pushing it and its rod 53 and the arm 54 backward, throwing the outer end of the other part 57 of the lever forward, it, through the medium of the connection 58 59 61, pulling the spring-rod 46 forward and releasing the brakes. To accomplish the same result from the other or rear end of the car, a connection is made from the arm 57 at that end of the car to one end of a lever 64, likewise pivoted in the bracket 51, by means of the rod and chain 62, sliding bar 60, and chain 63, while from the other end of such lever 64 a rod-and-chain connection 65 is made to the head 47 of the spring-rod 46. By these means, as is seen at a glance, the pushing back of such rear bumper-head causes the drawing out of rod 46 and the release of the brakes, as in the first instance.

As in backing a train the push or bump is first at one end of the car and then is transmitted by the car to the adjoining end of the next succeeding car, and as the first push or shove upon a bumper-head releases the brakes of that car, it is desirable that the pushing in of one bumper-head or the head at one end releasing the brakes should cause the further projection outwardly of the head at the other end, in order that it may act more forcibly and reliably on a bumper-head of the succeeding car to cause the release of the brakes of such car. In the mechanism for this end the sliding rods or bars 59 and 60, before mentioned as forming parts of connections from the bumper heads and rods to the spring-rod 46, have a part, the entire mechanism therefor being as follows: For their better support and to prevent sagging that they may be held in position to do their work, the slide-bars 59 and 60 are supported in slots in a bracket 66, fastened beneath the car. Upon each bar two catches or lugs are secured, those on bar 59 being 69 and 70 and those on 60 being 67 and 68.

In a bracket or support 72 is pivoted one end of a lever 71, while in a bracket or support 74 on the opposite side of the bottom of the car is pivoted one end of a lever 73. These levers, pivoted at opposite ends, normally lie about parallel and are such distance apart that the catches or lugs 69 and 70 on slide-bar 59 shall catch behind both levers and move them simultaneously, and the catches or lugs 67 and 68 on slide-bar 60 shall catch in front of them and as it is moved move them simultaneously. Similarly, then, if one bar—say 59—be pulled forward, as would be the case if the front bumper-head were pushed in, its catches or lugs move both levers 71 and 73. As the catch or lug 69 acts on lever 71 between the rod or slide-bar 60 and the pivot of lever 71, the latter moves through a larger arc, where it takes against the lug 67 on slide-bar 60, causing it to move quite a distance proportionately and pulling on the connection therefrom to the lever-arm 54 of the rear rock-shaft, turning such rock-shaft and projecting the rear bumper-head beyond the draw-bar or coupling-head. If, however, the rear bumper-head be pushed in, causing slide-bar 60 to be pulled to the rear, its lug or catch 68 moves the lever 73, which, acting on the lug or catch 70 on slide-bar 59, moves the latter, causing the front bumper-head to be projected.

Figure 7:
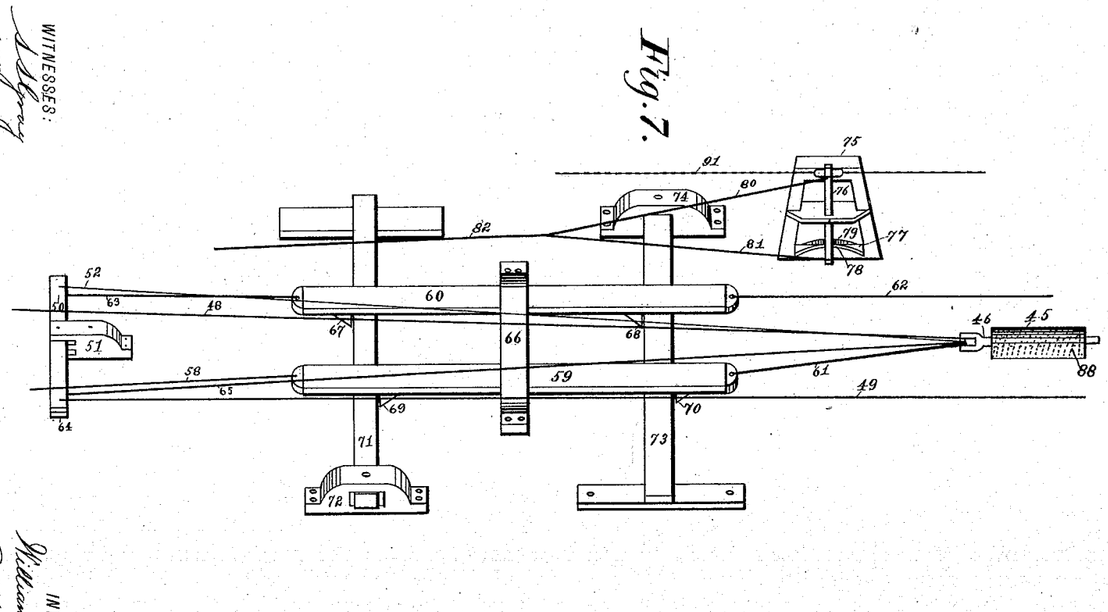
Fig. 7, a perspective view of a part of the devices for controlling the brake mechanism and for throwing it into operation on the breaking apart of a train.
Figure 9:
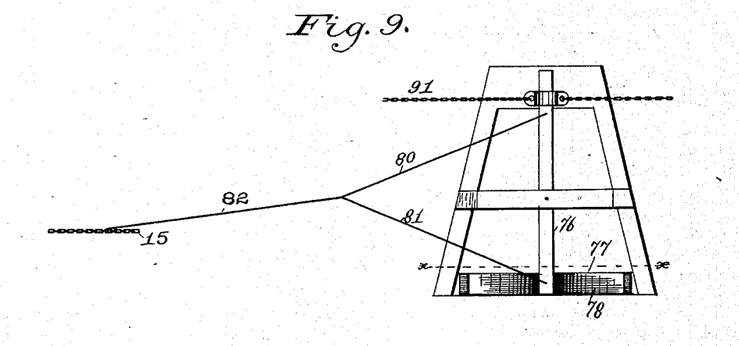
Fig. 9 is a front elevation of the devices for throwing the brake mechanism into operation on the breaking apart of a train.
Figure 10:
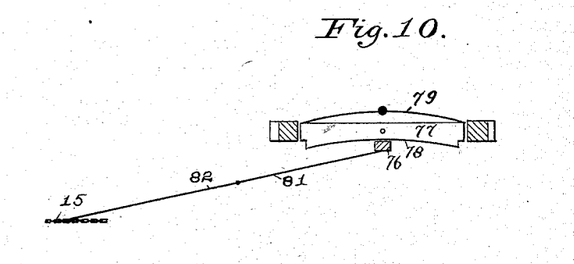
Fig. 10, a section on line $x\,x$, Fig. 9.

There is another contingency to be provided for in a complete system of automatic braking, and that is the danger arising from a train breaking in two. In such event the brakes should be set throughout the train to avert evil results therefrom, and this is done in the following manner: To a vertical standard or support 75 on the bottom of the car is centrally pivoted the upright lever 76. Pivoted in a recess near the base of the standard 75 is what may be termed "a spring-latch," which is maintained in a normal position in line with the length of the car by springs 79, applied to the back thereof. Its front edge is recessed or concaved, as shown at 78, in which depression the end of the lever 76 thereat is held, for if such end of the lever moved in either direction it would have to force back an end of the spring-catch 77 against the stress of springs 79. The lever 76 is thus maintained in a vertical position. From its ends proceed chains 80 and 81, which are then united to the single chain 82, which in turn is united to the chain 15, which lifts the shaft 6 and throws the brake mechanism into operation. It is evident, then, that if the lever 76 be moved in either direction from its normal vertical position it will, either through chain 80 or 81, pull upon 82 and 15 and cause the elevation of shaft 6.

Beneath the car extends a chain 91, whose central link passes over the lower end of the lever 76, so that any lengthwise movement of the chain will be communicated to the lever. At each end of the car is a support 93 for the chain, such support being adapted to hold the chain just taut from end to end of the car and in position on the lever 76, but to release the chain and allow it to move when any unusual strain is placed thereon. Its ends are of sufficient length beyond these supports to reach and meet the end of a similar chain from the adjoining car in the train, and its ends are provided with snap-hooks 92, that the chains 91 of the various cars of a train may be joined together to form one continuous chain, the parts of which between the various cars are so adjusted as to its length that no strain is ordinarily thereon, the chain being slack between the cars. If now a coupling gives way, the entire traction pull of the train is thrown on the chain at that point, pulling it through the entire length of the train, causing each individual chain to pull upon the lever 76, moving it, and through such movement causing, as before explained, the lifting of shaft 6 and setting of the brakes.

As it is desirable often that the entire brake system of a train should be under control of the engineer for operation on any sudden emergency, this system of devices controlled by this "train-chain" 91, as it may be termed, is utilized for that purpose.

On some suitable part of the engine or tender—say at the rear of the tender—a shaft or spindle 84 is journaled, upon whose center is an enlargement or a drum 83, to which may be attached the slack end of the chain 91 at the end of the car immediately next the tender.

Upon one end or on both ends of the shaft 84 is a lever 85, by which the shaft and its drum may be rotated. If, then, occasion arises for the engineer to set the brakes, he or some one turns the lever 85, rotating the drums sufficiently to wind enough chain thereon to give the necessary pull throughout the train to the chain to give the movement to lever 76 necessary to set the brakes. In order that such lever when thrown into operation may continue therein and hold the brakes set, the lower end thereof is caught by the end (over which it passes) of the spring-catch 77. Each end of such catch projects beyond the plane of the standard 75, and the end of the lever in passing thereover pushes it back against the spring 79, which throws the end forward again as soon as the end of the lever has passed thereover, such projecting end preventing its return, so that the spring-catch performs the double office of locking the lever in normal or non-operative position and in operative position.

Where this system is used the yard or switching engines should be provided with a bumping-head, of any ordinary construction, arranged to take against the bumper-heads 90, that the brakes of the car may be thrown off when being switched.

All the connections communicating motion from one part to another are made of rods and chains, unless otherwise specified, and this for two reasons—first, in some positions of the connections there will and must be a certain amount of slack, and this the chain portion permits, and, second, the chain gives opportunity for the proper adjustment of lengths to compensate for any small inequalities, however caused, for which purpose the rod and chain are secured together by the rod passing into a long end link through an aperture in the material of the end of the link and held therein by a nut taking on a threaded portion of the rod, all in a well-known way.

It will be noticed that all transfers of motion from one part to another are, with the single exception of the thrust upon the bumper-rods, by direct pull. As there is in such pulls no danger of bending or flexion of the rods, as would be the case of thrust strain, the parts may be made much lighter than if thrusting movements were made, and yet greater durability be insured as well as economy.

The spindle, hand-wheel, and ratchet of the ordinary hand-brake apparatus may be secured, as usual, on each platform of the car, and the chain from the drum or pulley wheel thereof be connected directly or through an intermediate lever, as the case may be, to the chain 15, so that the shaft 6 may be so raised and the brake mechanism thrown into operation and manually controlled.

Having thus described my invention, what I claim is—

1. The combination of the main axle of a car, a band-wheel located thereon, a shaft above such axle, a pivoted box for one end of such shaft, a sliding box for the other end of such shaft, a band wheel or pulley on such shaft, an endless belt or chain passing over both pulleys and loose thereon when the said shaft is in its lower position, a chain attached to such shaft for connecting it to a brake-lever, and a connection from the shaft or its sliding box to means for raising the shaft into operative position, substantially as set forth.

2. The combination of the shaft 6, the pivoted box 5, supporting one end thereof, the sliding box 7, supporting the other end thereof, the base 11, supported and sliding in grooved ways, the box 7, attached to such base 11 and through which axle 17 passes, the axle 17, the wheel 18 thereon, the wheel 19 on shaft 6, the belt 20, passing over said wheels, the chain 16, secured to the shaft, and means for moving the sliding box 7 and the end of the shaft, substantially as set forth.

3. The combination of the shaft 6, the pivoted box 5, the sliding box 7, the axle 17, band-wheels 18 and 19, chain belt 20, chain 16, for connecting shaft 6 to a brake-lever, a spring, and a connection from the spring to the sliding journal-box, the spring acting normally to lift the sliding journal-box and throw the shaft 6 into position to set and keep set a brake mechanism, substantially as set forth.

4. The combination of the shaft 6, the box 5 at one end thereof, the sliding journal-box 7 at the other end thereof, the main axle 17, band-wheels 18 and 19, belt 20, chain 16, attached to the shaft and adapted to connect it to a brake-lever, a spring, a connection from the spring to the sliding box, the spring acting normally to lift the sliding box and throw shaft 6 into operative position to set the brakes, a reciprocating draw-bar or coupling-bar, and a connection therefrom to the spring, whereby the stress of the latter is taken from the sliding box and the brakes thrown off when the draw or coupling bar is pulled forward, substantially as set forth.

5. The combination of shaft 6, box 5 at one end thereof, sliding journal-box 7 at the other end thereof, band-wheels 18 and 19, belt 20, chain 16, for connecting shaft 6 with a brake-lever, spring 88, rod 46, with head 47, connection 15 therefrom to the sliding journal-box 7, the coupling or draw bar 26, the housing or box 28 therefor, the spring 38, and a connection 48 from the coupling or draw bar at the front of the car to the head of the rod 46, substantially as set forth.

6. The combination of the shaft 6, box 5 at one end thereof, sliding journal-box 7 at the other end thereof, band-wheels 18 and 19, belt 20, chain 16, for connecting shaft 6 with a brake-lever, spring 88, rod 46, with head 47, connection 15 therefrom to the sliding journal-box 7, a sliding coupling or draw bar 26, acted on by spring 38 in the box or housing 28, lever 50, a connection 49 from one end thereof to the draw or coupling bar at the rear of the car, and a connection 52 from the other end of the lever 50 to the spring-acted-on rod 46, substantially as set forth.

7. The combination of the shaft 6, box 5 at one end thereof, sliding journal-box 7 at the other end thereof, band-wheels 18 and 19, belt 20, chain 16, for connecting shaft 6 with a brake-lever, rod 46, acted on by spring 88, connection 15 therefrom to the sliding journal-box 7, a sliding bumper or buffer head, and rods 90 and 53, the rock-shaft 55 and lever-arms 57 58, and a connection from one lever-arm at the front of the car to the spring-acted-on rod 46, substantially as set forth.

8. The combination of the shaft 6, box 5 at one end thereof, sliding journal-box 7 at the other end thereof, band-wheels 18 19, belt 20, chain 16, for connecting the shaft 6 to a brake-lever, rod 46, acted on by spring 88, connection 15 therefrom to the sliding journal-box 7, a sliding bumper or buffer rod 53, rock-shaft 55, lever-arms 57 58, a lever 64, a connection from one end thereof to the lever-arm 57 at the rear of the car, and a connection from the other end thereof to the spring-acted-on rod 46, substantially as set forth.

9. The combination of two buffer or bumper heads and bars, one at either end of a car, and each having a bar or rod 53, rock-shaft 55, and lever-arms 54 57, the sliding bar 59, with catches or lugs 69 70, the sliding bar 60, with catches or lugs 67 68, the pivoted levers 71 73, and the connections, as set forth, whereby as one bumper is pushed in the other is caused to be thrown out, substantially as set forth.

10. The combination of the draw-bar or coupling-bar 26, the spring 38 around the rear of the stem thereof, the box or housing 28, the stop-arm 39, the beveled extension-head 30 of the bar 26, and the latch-head 31, pivoted to the bar 26, substantially as set forth.

11. The combination of the draw or coupling bar 26, having the beveled side extension head 30, the bevel-headed latch 31, pivoted to or in the bar 26, the stop-arm 39, the spring 38, the box or housing 28, and the rubber bumper 36 within the box or housing, substantially as set forth.

12. The combination of the draw or coupling bar 26, having the inclined side head extension 30 and the lug or washer 37 at its rear end, the bevel-headed latch 31, pivoted to or in the bar 26, the stop-arm 39, the box or housing 29, inclosing the rear portion of bar 26, and the spring 38 around such portion of the bar and within the box or housing, substantially as set forth.

13. The combination of the draw or coupling bar 26, having the inclined side head extension 30 and the lug or washer 37 at its rear end, the bevel-headed latch 31, pivoted to or in the bar 26, the stop-arm 39, the box or housing 29, inclosing the rear portion of the bar 26, the spring 38 around such portion within the box or housing, a wheel 42 on the bar 26, and a chain 43 therefrom to the spindle of an ordinary hand-brake wheel or to a lever, substantially as set forth.

14. The combination of the shaft 6, box 5 at one end thereof, sliding journal-box 7 at the other end thereof, band-wheels 18 19, belt 20, chain 16, for connecting the shaft 6 to a brake-lever, the vertical pivoted lever 76, the spring-catch 77 therefor, a connection therefrom composed of chains 80 and 81 from the opposite ends thereof, and chains 82 and 15 to the sliding journal-box 7, and the train-chain 91, supported beneath the car and having snap-hooks 92 at its ends and having a link passing over the lower end of the lever 76, substantially as set forth.

15. The combination of the shaft 6, box 5 at one end thereof, sliding journal-box 7 at the other end thereof, band-wheels 18 19, belt or chain 20, chain 16, for connecting the shaft 6 to a brake-lever, the vertical pivoted lever 76, the spring-catch 77, chains 80 81 from the opposite ends of lever 76, the chains 82 and 15, connecting them to the sliding-box 7, the train-chain 91, supported beneath the car and having end connectors 92 for uniting a series of such chains and connected about its center to the lever 76, the spindle 84 on the tender or engine, the drum 83 thereon, to which the end of the series of chains 91 may be attached, and means for rotating the drum and spindle, substantially as set forth.

In testimony whereof I affix my signature in presence of two witnesses.

WILLIAM KEAST.

Witnesses:
R. M. McDERMOTT,
Z. F. WILBER.